Sept 17, 1957 K. PEARCE 2,806,749
JOURNAL BEARING ASSEMBLY
Filed June 7, 1954 3 Sheets-Sheet 3
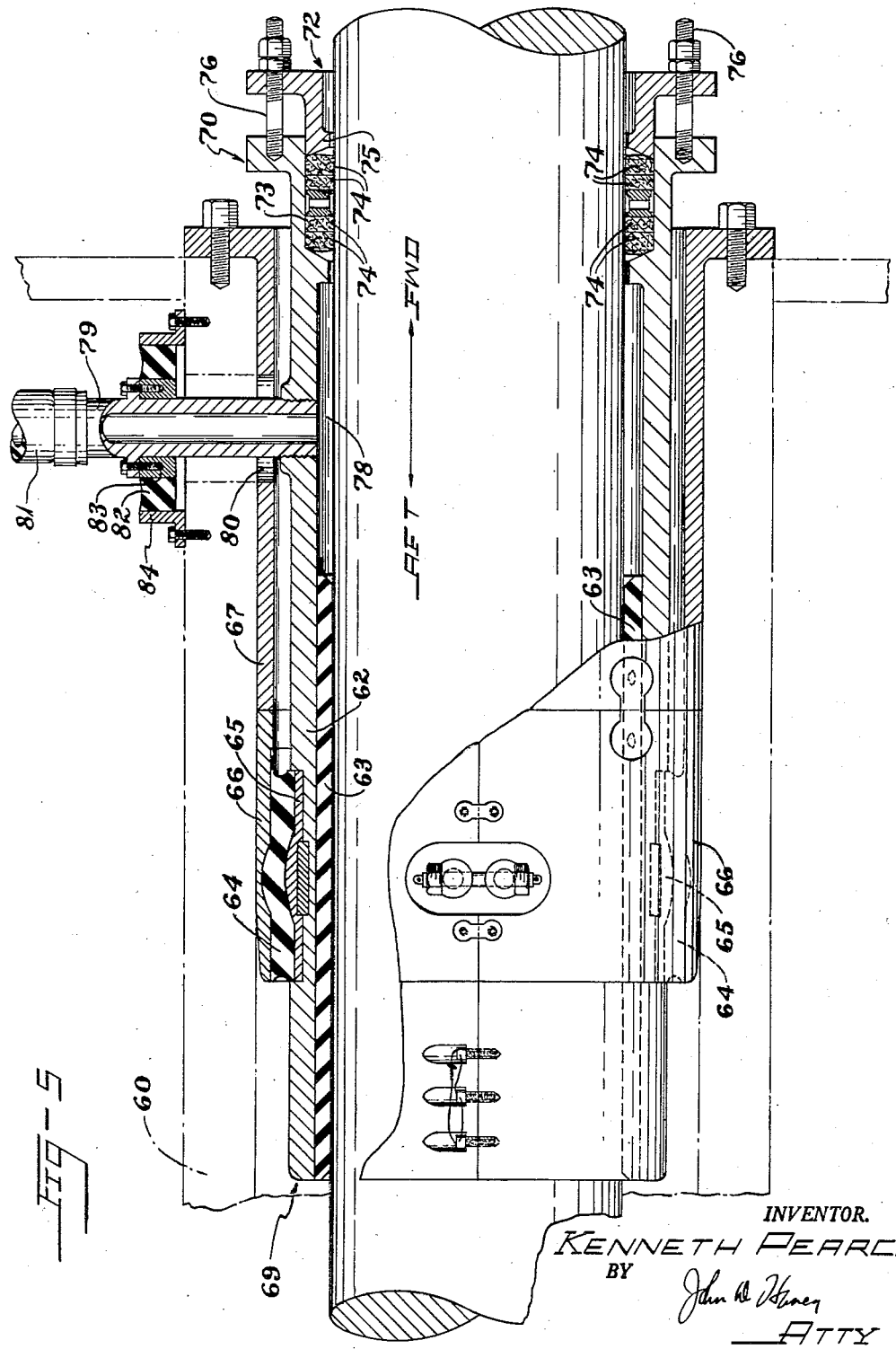
INVENTOR.
KENNETH PEARCE
BY
ATTY

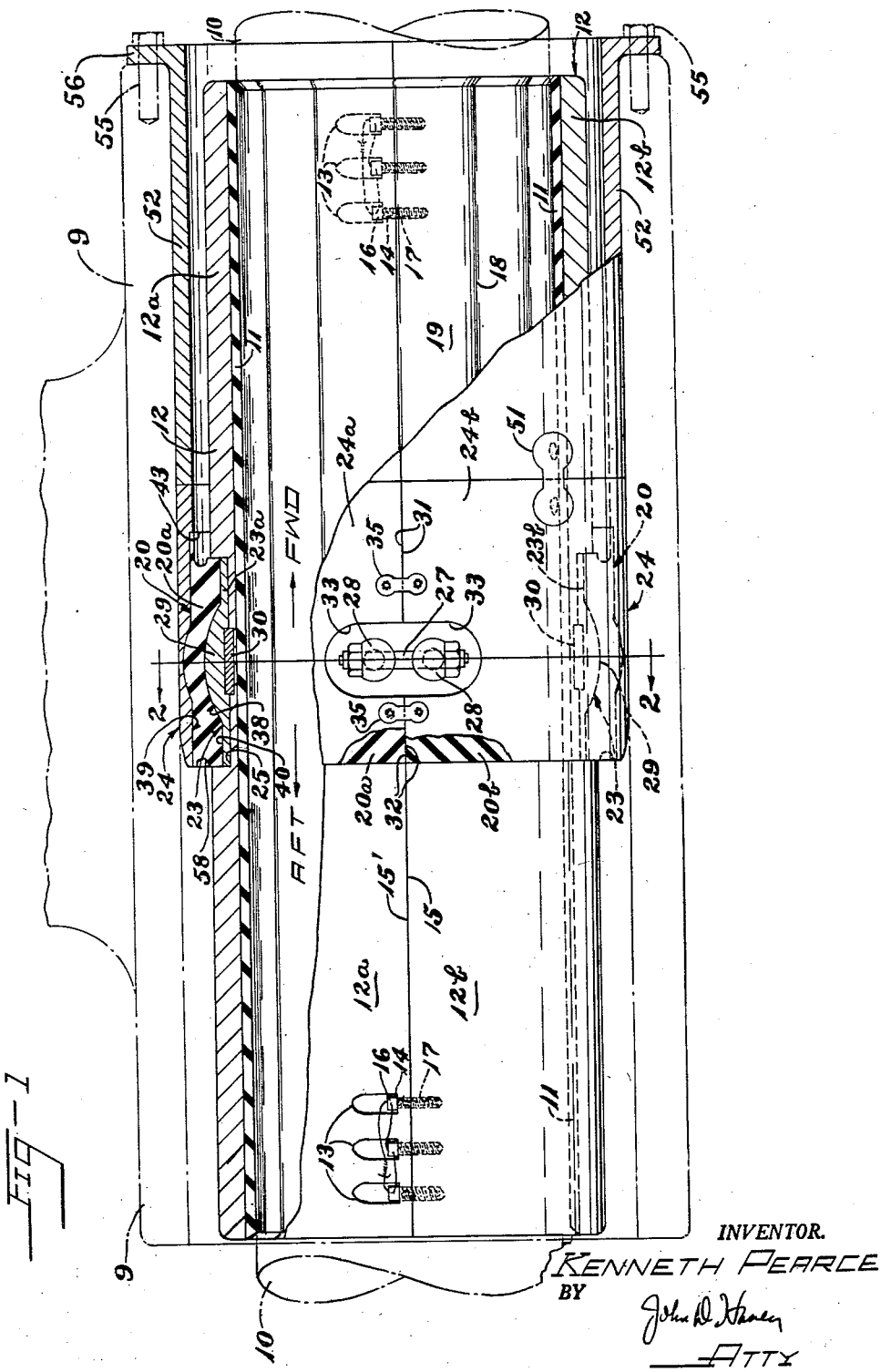

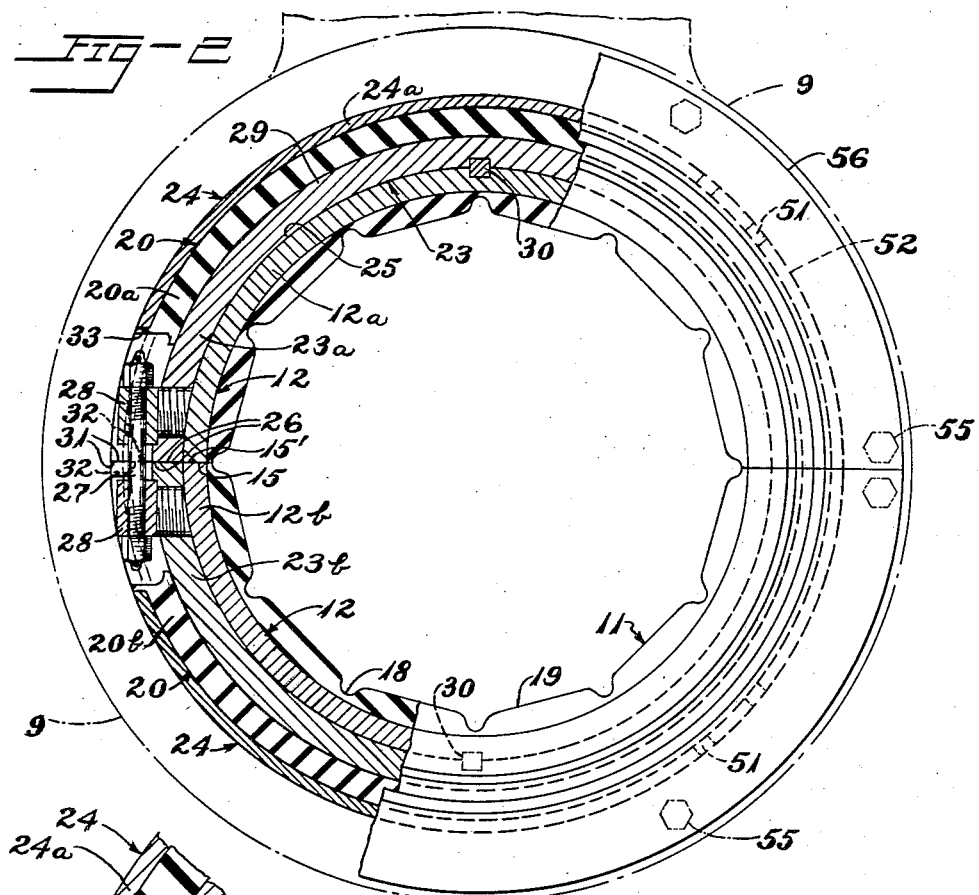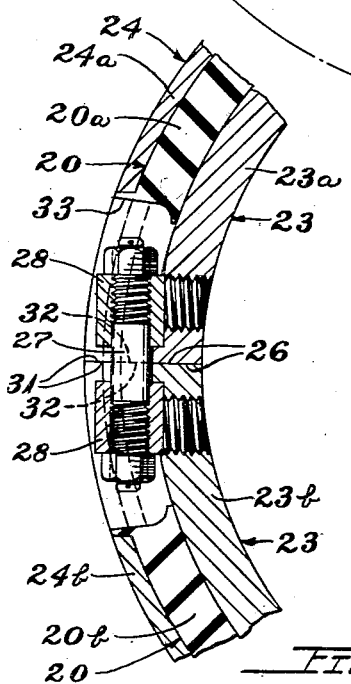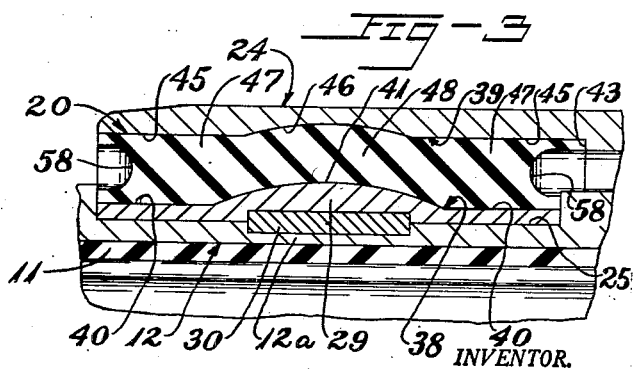

United States Patent Office 2,806,749
Patented Sept. 17, 1957

2,806,749

JOURNAL BEARING ASSEMBLY

Kenneth Pearce, Charlottesville, Va., assignor to The B. F. Goodrich Company, New York, N. Y., a corporation of New York Application June 7, 1954, Serial No. 434,882

6 Claims. (Cl. 308—238)

This invention relates to a resilient rubber journal bearing assembly particularly adapted for marine propeller shafting and the like.

Resilient rubber bearings have been found especially suitable for marine propeller shafting because they have exceptional resistance to corrosion and to abrasion resulting from particles of sand, silt, and the like which are carried in suspension in the water in which such shafts are normally immersed. In certain installations, however, these bearings have worn rapidly about the mouths of the bearing, and this wear has been accompanied by an objectionable squeal or howl which has prohibited the use of these bearings in submarines and certain other naval vessels. The wear and noise is believed to be caused by excessive localized loads on the bearing due to deflection and curvature in the shaft resulting from the weight of the heavy propellers and the diverse loads imposed on the shaft in service.

It has been recently proposed to suspend a rubber journal bearing by a secondary rubber body which permits the bearing to be tilted or to be otherwise displaced with various movements and deflections of the shaft, thereby greatly prolonging the life of the bearing and eliminating the objectionable noise condition. Assemblies of this type designed prior to this invention, however, have been primarily for vessels of new construction and in many presently existing vessels the clearance between a shaft and a shaft-housing or a stern tube is not of sufficient size to receive a bearing assembly of these earlier designs. It is accordingly an object of this invention to provide a bearing assembly in which the bearing is suspended by an exterior body of rubber arranged so that the assembly is adapted for use in vessels having a relatively small space about the shaft journal into which a bearing may be fitted and which additionally has certain improved operating characteristics. A further object of the invention is to provide a bearing assembly of the foregoing characteristics in which improved means is provided for maintaining a water-tight seal about the shaft where it projects through the hull of the vessel. In this latter embodiment of the invention a sealing structure is included integrally with the assembly so that the sealing structure may be displaced in response to movements of the shaft to maintain sealing engagement with the shaft.

The invention will be further described with reference to the accompanying drawings which illustrate certain preferred bearing assemblies made in accordance with and embodying this invention.

In the drawings:

Fig. 1 is a side elevation with portions partly broken away, showing a bearing assembly made in accordance with this invention mounted in the bore of a housing of a strut or the like of a vessel;

Fig. 2 is a cross-sectional view through the bearing assembly taken along the line 2—2 of Fig. 1;

Fig. 3 is a detail view drawn on an enlarged scale showing the cross-sectional shape of a rubber body which supports the bearing shell;

Fig. 4 is another detailed view drawn on an enlarged scale showing the shape of other portions of the structure; and Fig. 5 is a side elevation with portions partly broken away of a preferred bearing assembly which includes a sealing structure, the assembly being particularly adapted for a stern tube of a vessel.

In the form of the invention illustrated in Figs. 1–4, a bearing assembly embodying this invention is shown installed in a generally cylindrical housing 9 of a strut or shaft hanger for supporting a propeller shaft 10 on the exterior of the hull of a vessel. The bearing assembly comprises a bearing surface layer 11 of resilient rubber-like material secured to the inner wall of a rigid metal shell 12. The rubber bearing layer 11 is preferably vulcanized directly to the inner wall of the shell 12, but it may be secured to the shell in other ways known in the art. The shell 12 is tubular and is longitudinally divided into two complementary generally semi-cylindrical shell sections 12a and 12b, and the rubber bearing layer 11 is correspondingly divided to facilitate the manufacture and installation of the bearing. To fasten the shell sections together, the outer ends of the upper shell section 12a are formed with a group of sockets 13 each having a hole 14 extending to the longitudinal mating edges 15 of the section to receive a bolt 16. The bolts 16 register with and are threaded into corresponding holes 17 in the longitudinal edges 15' of the lower shell section 12b to draw the longitudinal edges 15 and 15' of the sections together. The bearing surface layer 11 is provided with circumferentially-spaced, axially-extending channels or grooves 18 (Fig. 2) which define axially-extending lands 19 forming bearing surfaces for rotatably supporting a shaft journal. The channels or grooves 18 provide passages for the circulation of water lengthwise through the inner shell to lubricate the lands 19 and to wash away any sand, silt, or other solid material which may have entered the bearing and accumulated in the grooves.

The shell 12 together with the resilient rubber bearing layer 11 is supported within the housing 9 by an assembly which includes a narrow resilient rubber body 20 which circumferentially encircles the exterior of the shell. The rubber body 20 is also axially divided in a manner corresponding to the shell sections, one portion 20a extending circumferentially about the upper shell section 12a, the other portion 20b extending circumferentially about the lower shell section 12b, and each located about the midpoint intermediate the ends of their respective shell sections. These portions of the rubber body are disposed between and vulcanized to each of a pair of concentric, radially spaced collars 23 and 24 which encircle the exterior of the inner shell 12. The outer collar 24 is received within the bore of the housing 9 substantially as shown in Fig. 1, and the inner collar 23 encircles and is secured to the exterior of the shell 12.

The inner collar 23 is preferably formed of metal and has a cylindrical inner surface which is received in a complementarily shaped channel 25 extending circumferentially around the exterior of the inner shell 12 substantially medially of the ends of the shell. The axial width of this collar is about one-fifth of the axial length of the shell 12 and the journal layer 11 as shown in Fig. 1 and normally the width of the collar will not be more than about one-third the axial length of the shell or the journal layer if the shell is longer than the layer. The groove 25 has radial sides which closely abut the end shoulders of the collar 23 to prevent axial relative movement between the collar and the shell. The collar 23 is formed in two semi-annular collar sections 23a and 23b, the collar section 23a embracing the upper shell section 12a and the collar section 23b embracing the lower shell section 12b. As indicated in Fig. 2, the ends of these collar sections 23 fit together along their axial edges 26 when the sections are assembled around the shell, and they are secured together on opposite sides of the shell by tie bolts 27 which project through the fittings 28 threaded into each of the shell sections adjacent the mating axial edges 26. The collar 23 is relatively thin near each end and has a considerably thicker medial portion 29, and the fittings 28 which receive the tie bolts are threaded into this thick medial portion. Rotation of the collar 23 relative to the shell is precluded by a pair of keys 30 which mutually engage suitable keyways in the thickened portion 29 of the collar and in the shell 12 and which extend in a direction parallel to the axis of the shell.

The outer collar 24 to which the outer periphery of the rubber body 20 is bonded, preferably by vulcanization, is formed in two generally semi-cylindrical sections 24a and 24b having mating axial edges 31 which fit together adjacent the axial edges of the collar 23 and the shell 12. The sections of the rubber body 20 are coextensive in circumferential length with their respective collar sections and these sections of the rubber body 20 fit together along mating axial edges 32 to form a fluid-tight seal around the exterior of the shell 12. In the mating edges of the collar sections 24 and the body sections 20 there are registering U-shaped cut-outs or recesses 33 which provide an access port through the outer collar to expose the tie bolts 27. The outer collar sections 24 are connected together by dumbbell-shaped locking keys 35 which hold the outer collar sections together during assembly with a shaft.

The axial contour of the opposing surfaces 38 and 39 of the inner collar 23 and the outer collar 24, respectively, is best shown in Figs. 1 and 3. Surface 38 which forms the outer periphery of collar 23 includes a pair of spaced cylindrical surfaces 40 flanking and blending smoothly into a central convexly curved surface 41 about the thickened medial portion 29 of the collar 23. The opposing surface 39 which forms part of the inner periphery of the collar 24 is of generally complementary shape to surface 38. It is formed at the bottom of an annular channel 43 in the collar 24 and includes a pair of spaced cylindrical surfaces 45 concentric with the surfaces 40 of collar 23 and flanking a central concavely-curved surface 46. The rubber body 20 is vulcanized to these surfaces of each collar and is shaped by these surfaces so that it includes a pair of cylindrical portions 47 flanking a curved medial portion 48. The cylindrical portions 47 are somewhat thicker in a radial direction than the curved portion 48 and preferably the radial thickness of the portions 47 is about twice the thickness of the rubber bearing layer 11 when the bearing assembly is installed in the housing 9. It may be seen from Fig. 3 that an appreciable portion of the rubber body 20 fits into the channel 25 together with the collar 23. This together with the channel 43 permits the use of a relatively thick body of rubber to support the inner shell even though there is a relatively narrow clearance space around the shell 12. The concave curvature of the surface 46 provides a greater volume of rubber in the medial portion of the body to be stressed in shear during the operation of the assembly as hereinafter explained.

Each collar section 23 together with its respective section of the body rubber and the corresponding section of the outer collar 24 are manufactured as an integral unit. In manufacturing these parts the rubber body 20 is formed somewhat thicker than its radial thickness after installation so that the body is radially compressed by the sections of the outer collar when these sections are connected by the keys 35 in making an assembly. The rubber body is compressed to such extent that compressive stress is maintained in the rubber body even at maximum lateral displacement of the shell 12 relative to the outer collar 24. Thus, the rubber body is prevented from passing from a state of compression to tension under the radial loads applied to the shell 12 and consequently the fatigue life of the rubber body is greatly prolonged.

To install the bearing assembly the shell sections 12 are preferably secured about a shaft by the screws 16 and then the units forming the collar sections are assembled about the shell. Thereafter the inner collar sections 23 are fastened by the tie bolts 27 and the outer collar sections 24 are urged together and are secured by the keys 35 to compress the rubber body 20. The outer collar sections are then additionally secured by several dumbbell-shaped keys 51 to another pair of semi-cylindrical members 52 which mate together coaxially of the collar 24 to provide a generally cylindrical outer casing concentric around the shell 12. Thereafter this assembly is slid axially along the shaft into the housing 9 and is secured to the housing by cap screws 55 through a radially outwardly-directed flange 56 at the end of the casing 52 which is adapted to abut the end surfaces of the housing. The exterior of the collar 24 and the casing members 52 may be tapered slightly to engage a complementary taper in the bore of the housing 9 to facilitate this assembly.

The annular end edges 58 of the rubber body 20 are molded with a concave contour to avoid the formation of stress-concentrating wrinkles or the like in these edges when the body 20 is compressed and when it is elastically deformed in service. Preferably the rubber body 20 is made of oil-resistant compounds and the metal elements of the bearing assembly are preferably naval brass Monel, or other corrosion-resistant metal.

The axial width of the rubber body 20 in the illustrated embodiment of the invention is equal to about one-fifth the axial length of the shell and preferably the width of the rubber will not exceed about one-third the axial length. In view of the size, shape and location of the rubber body the shell is particularly sensitive for tilting with the shaft as the shaft is deflected. Where a movement of the shaft tends to tilt the shell relative to the outer collar, thereby distorting the rubber body 20, the thick cylindrical portions 47 of the body will be compressed even greater than in the permanent static compression whereas the medial curved portion 48 of the body will have essentially a shearing force imposed on it. The cylindrical portions of the body therefore provide a marked snubbing effect on the degree of tilting which is especially desirable where the clearance about the shell is small and the resilience of these portions tends to restore the shell 12 to a position of coaxial alignment with the housing. Cyclic tilting loads by the shaft while the shell is in a tilted position are essentially resisted by the shearing of the curved medial portion 48. Also, as a result of changes in rotational speed of the shaft or other operating conditions, the shaft may tend to shift laterally or radially for rotation at positions eccentric of the housing 9. Such lateral shifting of the shaft radially compresses the cylindrical portions 47 of the rubber body but even in the shifted position of the shaft the curved center portion 48 of the body is effective to resist tilting movements through the shearing resistance of the body 48. This bearing assembly is also able to sustain appreciable thrust loads imposed by the shaft, since the shell 12 with the bearing layer 11 is free to shift longitudinally through the housing 9 with the thrust-type movements of the shaft. Such a load may also be imposed, for example, by the explosion of a depth charge or the like near a submarine which would tend to urge the shell 12 longitudinally along the housing, or the load may result from various motions of a propeller shaft. The rubber body 20 additionally cooperates with the bearing layer to protect the layer from loads tending to crush or pound the lands 19 by permitting the shell 12 and the layer 11 to rotate somewhat with the shaft when pressure of the shaft against the bearing layer becomes momentarily high, thereby stressing the rubber bodies in torsion. Such torsional movement is effective to relieve high pressure of the shaft against the bearing surface and to restore an adequate lubrication film between the lands 19 and the shaft journal. Also, the rubber body 20 effectively insulates the hull of the vessel from pounding or other shock-type loads which result from the rotation of a deflected shaft.

The embodiment of the invention illustrated in Fig. 5 is especially suitable for journaling the propeller shaft within a stern tube 60 of a vessel. The portions of this bearing assembly in which the shaft journal is supported are identical in structure and function to that of the bearing assembly of Figs. 1–4. That is to say, this assembly includes a shell 62 having a bore containing a rubber journal layer 63. The shell 62 is suspended within the stern tube by a body of resilient rubber 64 located medially about the portion of the shell 62 containing the rubber layer 63 and is the same shape as the rubber body 20 of the previous assembly and which is maintained between a pair of concentric collars 65 and 66. The outer collar 66 cooperates with a cylindrical casing 67 to secure the assembly within the stern tube, in the same manner as in the previously-described assembly. Usually in a stern tube bearing the axial extent of the rubber journal layer 63 may be somewhat less than the corresponding journal layer of a strut bearing assembly however. Also the axial width of the rubber body 64 is about one-third the axial length of the portion of the shell containing the layer 63.

In this embodiment the after end 69 of the shell 62 is exposed directly or indirectly to sea water and the forward end 70 of the shell projects into or communicates with spaces which extend inside the hull. To prevent water from the stern tube from entering the hull this bearing assembly is sealed externally about the shell 62 and also between the shell and the propeller shaft. An effective seal about the exterior of the shell is provided by the engagement of outer collar 66 with the bore of the stern tube and by the rubber body 64 which performs this function in addition to supporting the shell for the various movements previously described. To provide a seal about the shaft the forward end 70 of the shell projects forwardly from the bearing layer 63 and beyond the end of the cylindrical sleeve 67 and terminates in a stuffing box 72. The stuffing box includes a packing housing 73 formed integrally with the shell 62 to receive several coils of packing 74 which engage the shaft, and a gland sealing ring 75 which is adjustable axially of the housing to squeeze the packing against the shaft by means of the adjusting studs 76. The gland ring 75 may be axially divided similarly to the inner shell. Preferably the packing within the housing may include conventional internal lubrication devices to introduce lubricant to the packing. The desired degree of pressure engagement may be applied to the packing upon installation and since the stuffing box 72 is integral with the shell, it will be bodily displaced by the movements of the shell in response to the various types of deflections or other movements of the shaft. Hence, the radial loads which would otherwise be imposed on the packing are greatly minimized and the packing is capable of providing an effective seal for appreciably longer periods of operation than in prior installations where the stuffing boxes are rigidly secured to the hull of the vessel.

In a stern tube bearing it is generally desirable to increase circulation of lubricating water through the journal layer 63 by pumping water either into or out of a chamber 78 inside the shell between the journal layer 63 and the packing 74 through a conduit 79 which communicates with this chamber. The conduit 79 projects upwardly through an appropriate hole 80 in the outer sleeve 67 and in the stern tube and its upper end is connected to a flexible hose 81 from a suitable pump (not shown). The portion of the conduit extending through the hull is connected to the hull by an annular rubber ring 82 which is vulcanized to a collar 83 fastened to the conduit and to an annular angle bracket 84 which in turn is fastened to the hull. The conduit is movable axially through the opening 80 with tilting movements of the shell 62 and the rubber ring 82 is elastically deformable in shear to accommodate such movement. If the space inside the hull into which the conduit extends is a ballast tank, the annular rubber ring 82 provides a water-tight seal about the conduit.

Variations in the structure disclosed may be made within the scope of the appended claims.

I claim:

1. A bearing assembly for marine propeller shafting and the like, the assembly comprising a rigid shell having a generally cylindrical bore, a resilient rubber bearing layer within said bore of the shell adapted to engage a shaft journal extending through the shell, rigid supporting means circumferentially surrounding said shell in radially spaced relation, and a body of resilient rubber-like material interposed between said shell and said supporting means, the body having a medial portion circumferentially surrounding the shell and curved convexly outwardly from the shell in axial cross-section and generally cylindrical end portions coaxially flanking the ends of said medial portion, the axial width of the body not exceeding about one-third the axial length of the portion of the shell containing said layer and being located medially about the portion of the shell containing said layer, and the rubber body being maintained between said means and said shell in radial compression and universally supporting said shell relative to said supporting means by elastic deformation of said rubber body.

2. A bearing assembly for marine propeller shafting and the like comprising a rigid metal shell having a generally cylindrical bore, a resilient rubber bearing layer within the bore, the layer including lands extending longitudinally of the shell and grooves intermediate the lands to circulate liquid throughout the length of the bearing, a support member encircling the shell intermediate the ends of the shell, a body of resilient rubber-like material interposed between said shell and said support means, the body including a medial portion circumferentially surrounding the shell and curved convexly outwardly from the shell in axial cross-section and generally cylindrical end portions coaxially flanking the ends of said medial portion, the rubber body being vulcanized to said shell and to said support means, and the support means being circumferentially contractible to radially compress said body of rubber upon installation of the assembly.

3. A bearing assembly for marine propeller shafting and the like comprising a rigid shell having a generally cylindrical bore, a resilient rubber bearing layer within the bore to engage a shaft journal extending through the shell, the layer including lands extending longitudinally of the shell and grooves intermediate the lands to circulate liquid through out the length of the bearing layer, an outwardly-opening channel in the exterior of said shell and encircling the shell at about the midpoint intermediate the ends of the portion of the shell containing said layer, an annular inner collar seated in said channel, the collar being formed in arcuate members, fastening means interconnecting adjoining ends of said arcuate members of the inner collar, an outer collar concentrically surrounding said inner collar, and a body of resilient rubber-like material interposed between said outer and said inner collars and being vulcanized to the opposing surfaces of said collars, and a substantial portion of said body being seated in said channel with said inner collar, the body including an annular medial portion curved convexly outwardly from the shell and generally cylindrical end portions coaxially flanking the ends of said medial portion, the opposing faces of the collars to which said body is vulcanized having a contour complementary to the axial contour of said body, the axial width of said body not exceeding about one-third the axial length of the portion of the shell containing said rubber layer and the rubber body and said outer collar being formed in arcuate members corresponding to the arcuate members of said inner collar, ports through said outer collar and said rubber body to provide access to said fastening means of said inner collar, the members of the outer collar being circumferentially contractible to radially compress said body of rubber upon installation of the assembly, and means engageable with said outer collar for securing the assembly within a surrounding housing.

4. A bearing assembly in accordance with claim 1 and which additionally comprises a portion of said shell projecting coaxially from said portion in which the bearing layer is disposed and forwardly from the bearing layer, and a liquid sealing structure integral with said projection for circumferentially engaging the shaft, the sealing structure being displaceable by the shell to maintain a substantially uniform liquid-sealing engagement with a shaft during said displacement, said projecting portion of the shell defining between the sealing structure and the bearing layer a chamber to contain liquid for lubricating said bearing layer, a conduit communicating with said chamber for conducting liquid into or out of said chamber, and means for resiliently connecting said conduit to hull structure of a vessel.

5. A bearing assembly in accordance with claim 1 and which additionally comprises a portion of said shell projecting coaxially from said portion in which the bearing layer is disposed and forwardly from the bearing layer, and a liquid sealing structure integral with said projection and circumferentially engaging the shaft, the sealing structure being displaceable by the shell to maintain a substantially uniform fluid sealing engagement with a shaft during said displacement.

6. A bearing assembly for marine propeller shafting and the like, the assembly comprising a rigid shell having a generally cylindrical bore adapted to embrace a shaft journal extending through the shell, shell-supporting means located in radially-spaced relation to said shell intermediate the ends of the shell, and a body of resilient rubber-like material interposed between said shell and said supporting means, the body having a medial portion curved convexly outwardly from the shell in axial cross-section and generally cylindrical end portions coaxially flanking the ends of the said medial portion, the axial width of the body not exceeding about one-third the axial length of the shell, and the rubber body being maintained between said means and said shell in radial compression and universally supporting said shell relative to said supporting means by elastic deformation of said rubber body.

References Cited in the file of this patent

UNITED STATES PATENTS

| | | |
|---|---|---|
| 1,797,223 | Annis | Mar. 24, 1931 |
| 2,165,702 | Haushalter | July 11, 1939 |
| 2,306,664 | Scott-Paine | Dec. 29, 1942 |
| 2,487,653 | Heintze | Nov. 8, 1949 |
| 2,534,738 | Scott | Dec. 19, 1950 |
| 2,580,119 | Meyers | Dec. 25, 1951 |